US009300032B2

(12) United States Patent
Day

(10) Patent No.: US 9,300,032 B2
(45) Date of Patent: Mar. 29, 2016

(54) RFID ANTENNA SYSTEM AND METHOD

(75) Inventor: Edward Day, Pembroke Pines, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 1534 days.

(21) Appl. No.: 11/930,817

(22) Filed: Oct. 31, 2007

(65) Prior Publication Data

US 2009/0108996 A1 Apr. 30, 2009

(51) Int. Cl.
| G08B 13/14 | (2006.01) |
| H01Q 1/22 | (2006.01) |
| G06K 19/077 | (2006.01) |
| G08B 13/24 | (2006.01) |
| H01Q 9/28 | (2006.01) |

(52) U.S. Cl.
CPC ........ H01Q 1/2225 (2013.01); G06K 19/07749 (2013.01); G06K 19/07786 (2013.01); G08B 13/2417 (2013.01); G08B 13/2437 (2013.01); H01Q 9/285 (2013.01)

(58) Field of Classification Search
USPC ............... 340/572.1–572.7, 825.54, 568.1
See application file for complete search history.

(56) References Cited

U.S. PATENT DOCUMENTS

| 5,859,587 A * | 1/1999 | Alicot et al. ............... 340/572.8 |
| 5,939,984 A * | 8/1999 | Brady et al. ............... 340/572.1 |
| 5,955,951 A * | 9/1999 | Wischerop et al. ........ 340/572.8 |
| 6,254,953 B1 * | 7/2001 | Elston ................ G08B 13/2434 340/572.1 |
| 6,822,569 B1 * | 11/2004 | Bellum et al. ............. 340/572.1 |
| 7,109,867 B2 * | 9/2006 | Forster ....................... 340/572.3 |
| 7,183,917 B2 * | 2/2007 | Piccoli et al. ............... 340/572.1 |
| 7,342,498 B2 * | 3/2008 | Baba et al. ................. 340/572.5 |
| 7,804,407 B2 | 9/2010 | Copeland |
| 7,804,410 B2 | 9/2010 | Copeland |
| 7,804,411 B2 | 9/2010 | Copeland |
| 7,812,729 B2 | 10/2010 | Copeland |
| 2001/0054960 A1 * | 12/2001 | Kolton ............... G08B 13/2434 340/572.8 |
| 2003/0132893 A1 | 7/2003 | Foster et al. |
| 2004/0035526 A1 * | 2/2004 | Chamandy ........... G06K 19/027 156/293 |

(Continued)

FOREIGN PATENT DOCUMENTS

| DE | 10136502 A1 | 2/2009 |
| EP | 1689020 A1 | 8/2006 |

(Continued)

OTHER PUBLICATIONS

European Search Report dated Mar. 5, 2009 for International Application Serial No. PCT/US2008/011303, International Filing Date Sep. 30, 2008 consisting of 7-pages.

*Primary Examiner* — Firmin Backer
*Assistant Examiner* — Nay Tun
(74) *Attorney, Agent, or Firm* — Robert J. Sacco, Esq.; Carol E. Thorstad-Forsyth, Esq.; Fox Rothschild LLP

(57) ABSTRACT

The present invention provides an RFID device having a substrate body, and an IC component and antenna disposed thereon. The RFID device may further include one or more spacing elements, wherein at least a portion of the substrate body is adapted to be disposed around at least a portion the spacing element, thus reducing the overall size of the substrate body with proper impedance matching. The RFID device may further include an EAS element coupled to the substrate body and/or the spacing element in order to create a combination RFID/EAS device with the ability to reduce its overall footprint without sacrificing the ability to provide both identification and article surveillance functions.

18 Claims, 4 Drawing Sheets

(56) References Cited

U.S. PATENT DOCUMENTS

| | | | |
|---|---|---|---|
| 2005/0134506 A1* | 6/2005 | Egbert | 343/700 MS |
| 2006/0032926 A1* | 2/2006 | Baba | G06K 19/07749 235/492 |
| 2006/0176236 A1 | 8/2006 | Homolle et al. | |
| 2007/0096917 A1 | 5/2007 | Yang | |
| 2007/0126588 A1 | 6/2007 | Mess | |
| 2007/0273520 A1* | 11/2007 | Chamandy | G06K 19/07749 340/572.1 |
| 2008/0055045 A1* | 3/2008 | Swan et al. | 340/10.1 |

FOREIGN PATENT DOCUMENTS

| | | |
|---|---|---|
| EP | 1793332 A1 | 6/2007 |
| JP | 2005033461 A1 | 2/2005 |
| WO | WO 2006055653 A1 * | 5/2006 |

\* cited by examiner

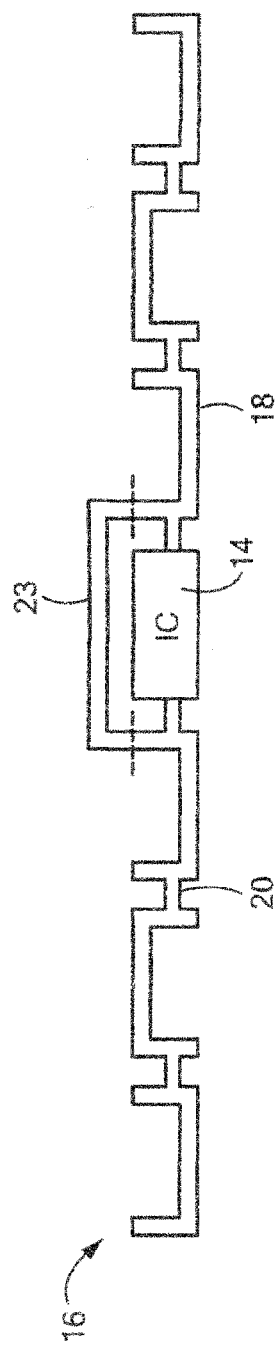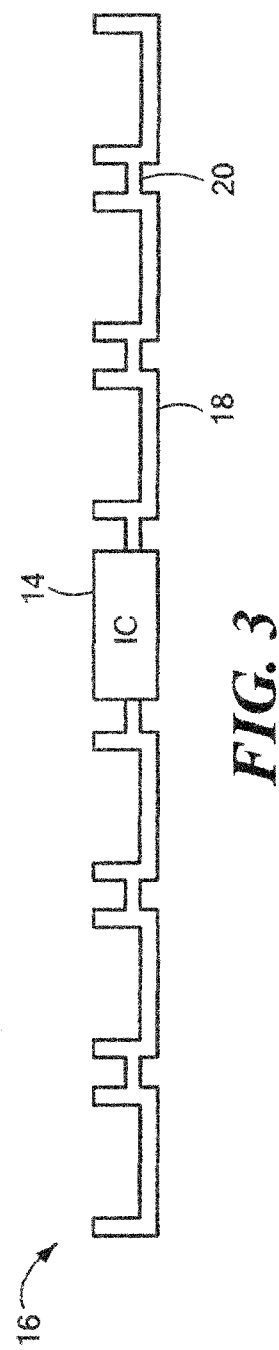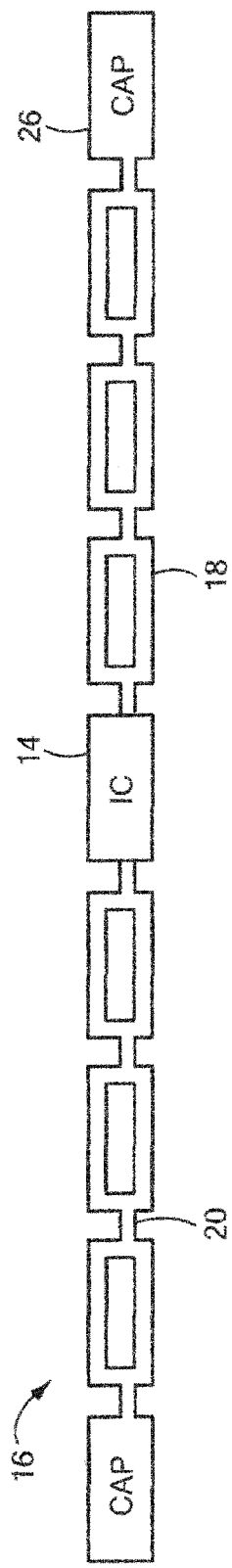

RFID ANTENNA SYSTEM AND METHOD

CROSS-REFERENCE TO RELATED APPLICATION

Not Applicable.

STATEMENT REGARDING FEDERALLY SPONSORED RESEARCH OR DEVELOPMENT

Not Applicable

FIELD OF THE INVENTION

The present invention relates to the field of radio frequency identification ("RFID") communications, and in particular towards RFID transponder configurations.

BACKGROUND OF THE INVENTION

Radio frequency identification (RFID) devices are becoming increasingly popular for a variety of industrial, retail, transportation, and other applications. RFID technology provides a positive identity for any object, person, or the like, bearing an RFID transponder through the use of a passive, radio frequency signal. In a typical application, an RFID transponder comprises an antenna and an integrated circuit. When a separate RFID reading device broadcasts a radio frequency signal, the signal interacts with the RFID transponder antenna. The transponder antenna converts part of the received RF signal energy into an electrical current. This electrical current powers the integrated circuit. The integrated circuit then modulates its impedance to create a return RF signal. This return RF signal is then detected by the antenna in the RFID reading device. This modulated, RF return signal carries encoded data about the transponder based on the data previously stored in the integrated circuit. For example, the serial number of the transponder may be returned to the RFID reading device via this modulated RF signal. Finally, the RFID reading device decodes the signal returned from the transponder to complete the identification.

RFID transponders are being integrated into a growing number of applications. Employee identity badges, animal identity devices, retail pricing and inventory devices, retail security devices, manufacturing product and material tracking devices, vehicle identification devices, and the like, are just a few examples of the expanding area of applications for RFID technology. RFID transponders are ideally suited for integration with a wide variety of products and in a wide variety of situations. RFID transponders may be purely passive devices where all of the energy for operating the integrated circuit is derived from the broadcast RF signal. Alternatively, active RFID systems may incorporate an on-board battery to provide power to the identity chip and/or power for the transponder's return RF signal. In fixed systems, such as motor vehicle transponders used for automated toll collection, the additional cost of the on-board battery is easily justified by the improved performance of the device. Conversely, in cost sensitive applications such as retail pricing and security tags, the RFID transponder device must be as inexpensive as possible and is therefore, typically, a passive device.

The on-board antenna is a key enabling technology for RFID transponder devices. The broadcast RF energy may be in the form of a magnetic field, an electric field, or a mixed field as in typical radio signal broadcast. The transponder antenna is designed with a shape and a size based on the characteristics of the broadcast RF energy such as the field type and the signal frequency. Moreover, the design of RFID tags typically requires matching the antenna impedance and load impedance, usually by a matching circuit, for maximizing the RF power from the reader's interrogation or command signal received at the tag antenna to be delivered to the RFIC with minimum loss, and thereby achieve optimum tag sensitivity. Theoretically, maximum power delivery is achieved by conjugate impedance matching, which demands that the impedance from the antenna be, as closely as possible, the mathematical conjugate of the RFID input impedance. This represents an ideal impedance match.

In many applications, it is desirable to reduce the overall size or "footprint" of a particular RFID device. The reduced size may be required for inclusion on or in retail goods having small dimensions. Alternatively, it may simply be desirable to make the RFID device as inconspicuous as possible. While technology exists to drastically reduce the size of an IC component of an RFID device, similar miniaturization of the antenna of an RFID device can result in a significant reduction in performance. As stated above, a particular IC and antenna of an RFID device ideally have matched impedance characteristics. By reducing the overall size of the RFID device, and thus the antenna, it may prove difficult to adequately provide the impedance characteristics for efficient function of the device. As such, the RFID may suffer from inefficient power transfer to the IC, a reduced operating range with respect to an interrogator, and a weak return signal in response.

In addition, an antenna connected to a RFID tag is generally designed for operation on a specific or narrow range of substrates to which it may be attached. Other substrates may cause the radiation efficiency of the antenna to deteriorate from the designed optimal mounting substrates. Thus, the antenna, and consequently the RFID device, will no longer function as intended. This loss of antenna efficiency may be due to a number of variable packaging factors. For example, each substrate has its own dielectric and conductive characteristics that typically affect the impedance matching between the wireless communication device and its antenna. Impedance matching ensures the most efficient energy transfer between an antenna and the wireless communication device, as discussed above, and placement of an RFID device in proximity to a surface having dielectric and conductive properties outside of a particular range may reduce the performance of the RFID device. These adverse effects to the performance of an RFID device may also be experienced upon the inclusion or integration of an electronic article surveillance ("EAS") tag or device. Such EAS devices often include a magneto-acoustic mechanism having one or more metallic components that may subsequently interfere with or reduce the performance characteristics of a particular RFID device.

In view of the above, it would be desirable to provide an RFID device having a reduced footprint while providing for efficient operation on a variety of surfaces and/or in combination with an EAS tag.

SUMMARY OF THE INVENTION

The present invention advantageously provides a method and system for an RFID/EAS device. In accordance with a first aspect of the present invention, an RFID device is provided having a dielectric substrate body, an antenna disposed on the substrate body, and a first spacing element, where at least a portion of the substrate is wrapped around a portion of the spacing element.

The substrate may be constructed from a material including at least one of polyimide, polyester, fiberglass, ceramic, plastic, and paper, and the antenna may be constructed from a material including at least one of copper, aluminum and conductive ink. The antenna may include an electrically conductive material patterned on a surface of the substrate body. In particular, the pattern includes a plurality of polygons, such as one or more polygons having a substantially rectangular shape with squared or rounded corners. The pattern can also include meanderline (meandering pattern) segments. The plurality of polygons of the antenna may be non-continuous and/or include a non-conductive opening or break therein to thereby provide a single electrically conductive path. Further, one or more capacitors may be disposed on the substrate and in electrical communication with the antenna.

In another aspect of the present invention, an RFID/EAS device is provided. The RFID/EAS device may generally include a dielectric substrate body, an antenna disposed on the substrate body, a first spacing element, and a second spacing element. In addition, an EAS element may be disposed between the first and second spacing elements, and at least a portion of the substrate body may be positioned to surround a portion of both the first and second spacing elements. The EAS element may include an acousto-magnetic device and/or a microwave device.

In yet another aspect of the present invention, a method of assembling an RFID/EAS device is provided, where the method includes the steps of providing an RFID device having a dielectric substrate body and an antenna disposed on the substrate body. The method further includes positioning an EAS element between a first spacing element and a second spacing element, and subsequently wrapping at least a portion of the RFID device around at least a portion of the first and second spacing elements.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 2 illustrates an alternate embodiment of an antenna pattern for an RFID device constructed in accordance with the present invention;

FIG. 3 illustrates yet another embodiment of an antenna pattern for an RFID device in constructed accordance with the present invention;

FIG. 4 illustrates the use of one or more capacitors electrically coupled to the antenna in constructed accordance with the present invention

DETAILED DESCRIPTION OF THE INVENTION

Figure 1:
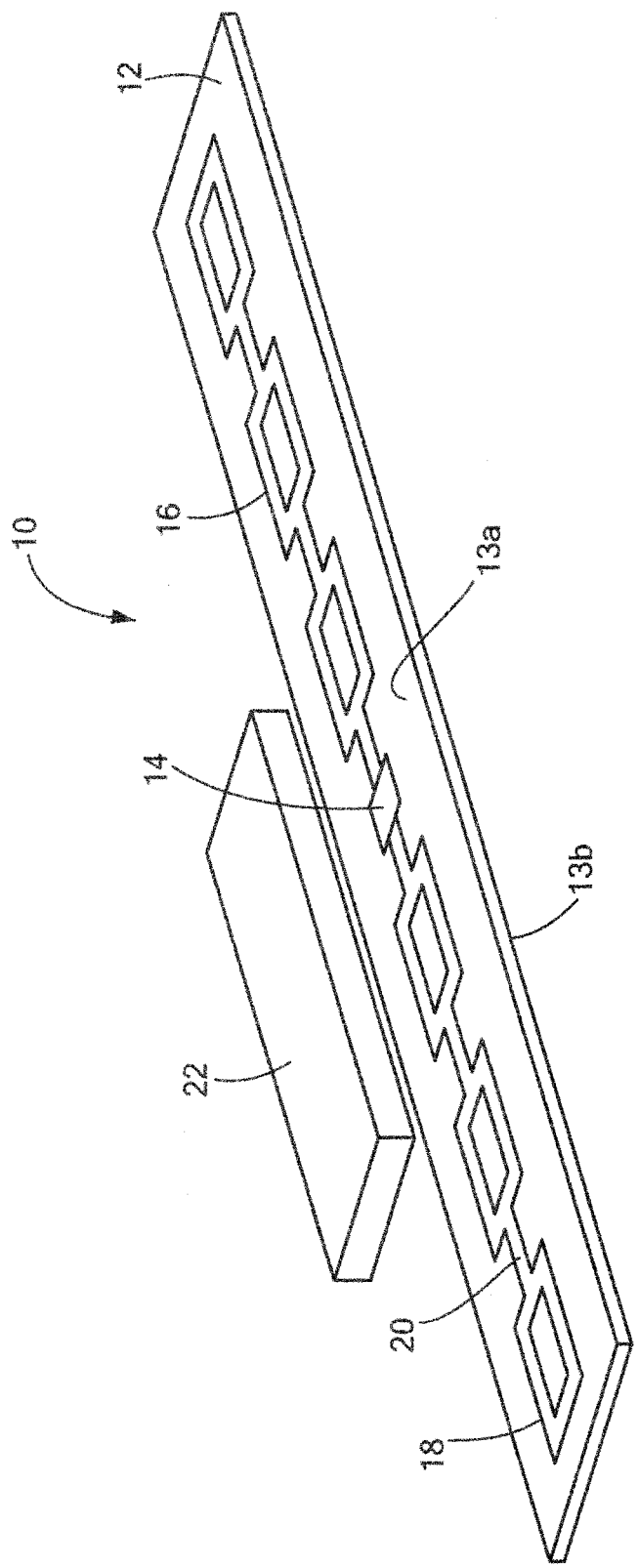
FIG. 1 illustrates of an embodiment of an RFID device constructed in accordance with the present invention.

Referring now to the drawing figures in which like reference designators refer to like elements, there is shown in FIG. 1 a diagram of an exemplary apparatus constructed in accordance with the principles of the present invention and designated generally as "10". Apparatus 10 is an RFID device that may generally include a substrate body 12, with an integrated circuit ("IC") component 14 coupled to the substrate body 12, as well as an antenna 16 disposed on the substrate body 12 in electrical communication with the IC component 14. Antenna 16 may generally include a pattern of conductive material. In particular, the antenna 16 may include a plurality of substantially square or rectangular shaped polygons 18 having squared or rounder corners, where a portion of the polygons 18 are hollowed out, i.e., do not contain a conductive material. The plurality of polygons 18 may be electrically coupled to one another by a strip or portion of conductive material 20 connecting each polygon 18, and further connecting the plurality of polygons 18 to an IC component 14. Although not shown, it is also contemplated that pattern of antenna 16 can take the form of a meanderline segment such that the overall length of antenna 16 is greater than the distance from the end point of the antenna coupled to IC component 14 to the outer edge of substrate body 12. This can be accomplished, for example, by allowing antenna 16 to "meander" back and forth along substrate body 12 as antenna 16 runs from IC component 14 to the outer edge of substrate body 12. Meanderline segments can be used separately or in connection with one or more polygons. The antenna 16 may further include a conductive coupling (not shown) between first and second portions of the antenna 16 on either side of IC component 14. The coupling can provide a current loop to increase or otherwise optimize the performance characteristics of the antenna 16.

Apparatus 10 may further include a spacing element 22, where at least a portion of the substrate body 12 surrounds at least a portion of the spacing element 22. Discussed below in detail, the RFID device 10 may also include an EAS element such as an acousto-magentic device (not shown in FIG. 1), coupled to at least one of the substrate body 12 and/or spacing element 22.

In particular, the substrate body 12 may generally define a first surface 13a and a second surface 13b opposite the first surface 13a, where the first surface 13a may receive the IC component 14 and at least a portion of the antenna 16. The first surface 13a may include dielectric properties as to reduce or eliminate the likelihood of interference with the antenna 16 or to otherwise prevent shorting the antenna 16 and/or the IC component 14. The second surface 13b may be suited for fixation or other coupling to a particular item, packaging, or the like. For example, the second surface 13b may include an adhesive property or the like to facilitate placement of the RFID device 10. In addition, the second surface 13b may have similar dielectric properties to that of the first surface. The substrate body 12 may include one or more layers of a substrate constructed from a flexible material, such as an organic material like polyimide or polyester for example. The substrate body 12 may have an elongated, rectangular shape appropriately sized for a given application, although a myriad of shapes and sizes may be used for varied circumstances.

The IC component 14 of the RFID device 10 may be coupled to or otherwise positioned on the first surface 13a of the substrate body 12. The IC component 14 may generally include an integrated circuit device capable of storing multiple bits of data, and may further be capable of modulating current in the antenna of the RFID device 10 to thereby encode data onto an RF signal. In particular, the IC component 14 may include a semiconductor-based device, such as a silicon chip, and may further include active and/or passive elements such as transistors, resistors, capacitors, and the like, integrated thereon. For example, the IC component 14 may include a passive network of resistors, capacitors, and/or inductors that exhibits a resonance response to an incoming RF signal. In addition, the IC component 14 may include a diode device to simply rectify the incoming RF signal. The IC component 14 may further include a fixed response frequency and/or identifying data pattern, and alternatively may include a response frequency and/or identifying data pattern that is programmable and/or re-programmable.

The RFID device 10 of the present invention further includes antenna 16 disposed on the first surface 13a of the substrate body 12, where the antenna 16 is able to conduct an RF signal. The antenna 16 may include a patterned configuration of conductive material in electrical communication with the IC component 14 to transmit a signal both to and from the IC component 14. The pattern of the antenna 16 may be modified and/or selected to provide desired impedance characteristics to compliment the electrical characteristics of the IC component 14 for optimal use and performance of the RFID device 10. The antenna 16 may be comprised of a material having sufficiently high electrical conductivity, such as a metallic material comprising copper (Cu) or aluminum (Al), or a microwave conductive carbon fiber. The antenna 16 may be patterned onto the first surface 13a of the substrate body 12 utilizing any commonly known patterning method such as but not limited to a photolithographic, ion etching, chemical etching, or vapor deposition process. The antenna 16 may generally include a dipole configuration with the IC component, 14 although a monopole configuration may be equally applicable with the present invention.

In addition, the antenna 16 may be patterned to provide either a single conductive path or, alternatively, multiple electrical paths in series. For example, the antenna pattern may include a plurality of connected polygons 18 providing a path for conducting a desired signal. Each polygon 18 may have a substantially continuous shape, where a plurality of the polygons 18 are connected to one another to define a series of conductive paths therethrough. The polygons of a particular antenna pattern may be "hollowed" or have varying dimensions or thickness of conductive material in order to provide a desired impedance for a particular application.

Alternatively, as shown in FIG. 2, antenna 16 may include a patterned of "open-ended" polygons 18 that provide a single electrically conductive flow path. The pattern of polygons 18 in FIG. 2 are non-continuous, i.e., a side or portion of each polygon 18 is non-conductive, thereby providing a single electrically conductive flow path through the length of the antenna 12. In FIG. 2, the polygons 18 are configured in an alternating pattern. Similar to the previous antenna arrangement depicted in FIG. 1, the plurality of non-continuous polygons 18 may be in electrical communication with one another by a link or deposit of conductive material coupling the plurality of polygons 18 together, as well as coupling the antenna pattern to the IC component 14. In addition, should the antenna 16 include a dipole configuration extending on either side of the IC component 14, there may be a conductive strip or portion 23 connecting the two sides of the antenna to one another to form a current loop or electrical path external to or independent of the IC component 14, as shown in FIG. 2.

FIG. 3 illustrates another antenna configuration whereby each polygon 18 is non-contiguous, as in the embodiment shown in FIG. 2. However, in this configuration, the orientation of each polygon 18 is repeated. The present invention is not limited to any particular orientation of polygons 18 and may include a combination of patterns and not only those depicted in FIGS. 2 and 3. By varying the patterns of the polygons 18 (or meanderline), a different overall impedance can be obtained.

Of note, although the embodiments shown in FIGS. 2 and 3 show symmetric antenna segments on each side of IC chip 14, the present invention is not limited to such. It is contemplated that asymmetric antenna segments can be implemented, for example, by employing different numbers of polygons 18 on each side of IC chip 14.

Similarly, as shown in the exemplary embodiments of FIGS. 1-3, the capacitive and inductive portions of the impedance used to match the antenna to IC chip 14 can be derived from antenna 16 itself without the need for external discrete devices. By varying the length of the electrically conductive path of antenna 16, the capacitive and inductive portions of the impedance can be altered. By way of non-limiting example, extending the length of antenna 16 results in an increase in the capacitive and inductive portions of the impedance. In a case such as that shown in FIG. 1, where the resultant length of antenna 16 exceeds the length of the spacer 22 (or EAS element), as discussed below in detail, substrate body 12 (along with antenna 16) can be wrapped around the spacer to minimize overall package size.

In FIG. 4, one or more discrete capacitors 26 may be electrically coupled to either or both ends of the antenna 16 to provide the desired electrical capacitive characteristics of the RFID device. As used herein, the term "capacitor" is intended to include any element or structure exhibiting capacitance properties. For example, it may include an extended portion of the antenna 16 or the like, and is not limited to a configuration of a discrete "capacitor" component made of two charged conducting surfaces having opposite polarities separated by a dielectric. Although not necessary based on the use of electrically conductive path length of antenna 16 itself to create a matching impedance, discrete capacitors 26 and/or discrete inductors (not shown) can be implemented in any of the antenna arrangements described herein.

As described above, the RFID device 10 of the present invention may further include one or more spacing elements 22 coupled to the substrate body 12 to offset or otherwise manipulate the position of the substrate body 12, or any portions thereof relative to one another. Each spacing element 22 may define a substantially planar body having non-conductive and/or dielectric properties, and may be constructed from a nonconductive plastic, polymer, or other suitable insulating material. For example, the spacing element 22 may constitute a substantially rectangular-shaped portion of insulating foam, where the spacing element has a thickness of less than approximately 3 mm.

Figure 5:
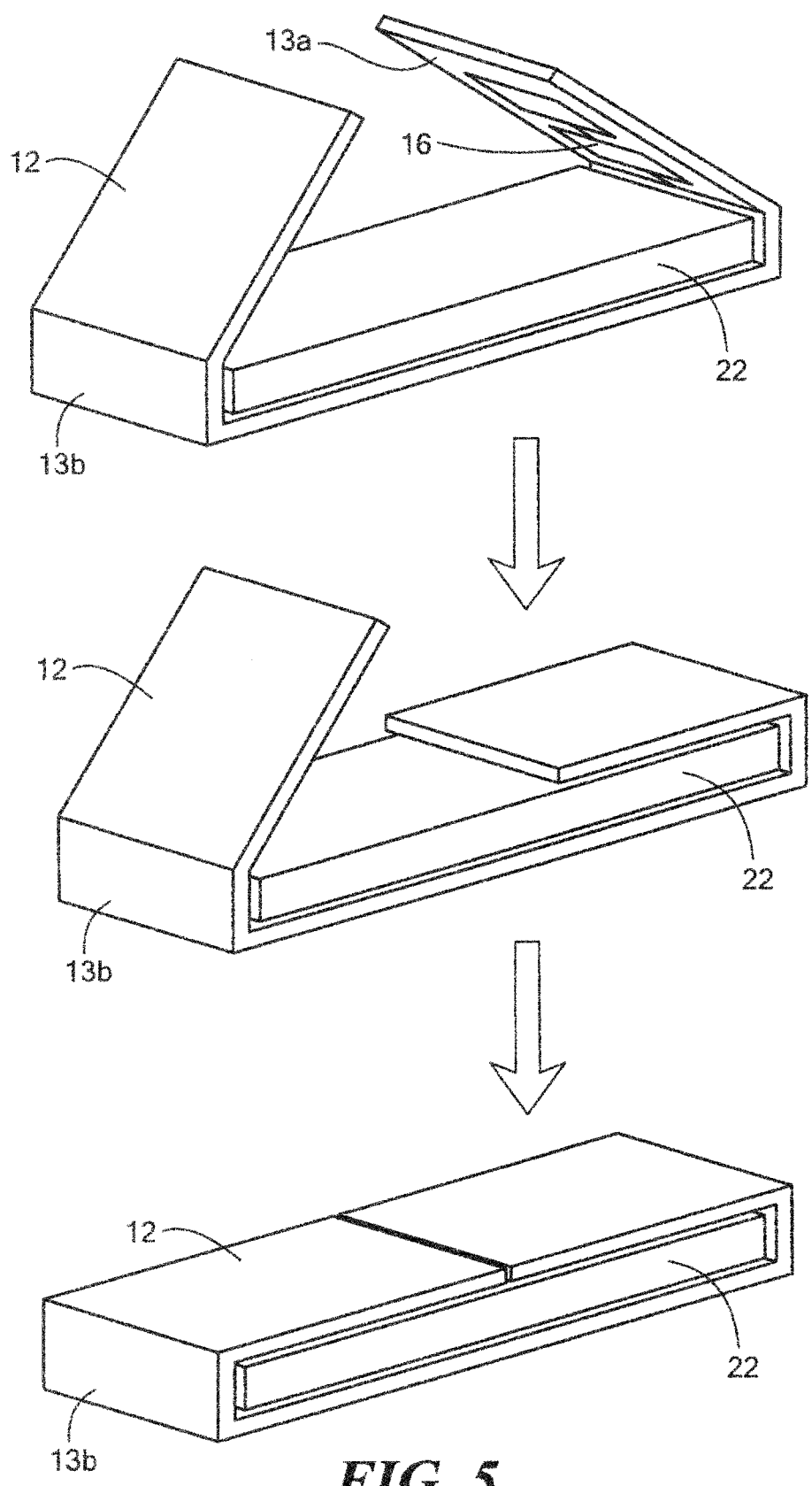
FIG. 5 illustrates the ability of the antenna to be wrapped around a spacer element in accordance with the present invention.

FIG. 5 shows an exemplary configuration of the RFID device 10 of the present invention using any of the aforementioned antenna configurations. As discussed above, IC component 14 is coupled to a non-conductive surface of the substrate body 12. The antenna 16 extends from and is in electrical with the IC component 14 on the substrate body 12 to provide the desired impedance characteristics as described above. At least a portion of the substrate body 12 of the RFID device 10 may then be positioned about an exterior perimeter or portion of the spacing element 22. Subsequently, the substrate body 12 may be substantially wrapped, folded or otherwise disposed around the spacing element 22 such that both the IC component 14 and the antenna 16 are facing or otherwise in proximity to the spacing element 22. Of note, although FIG. 5 shows a spacing element 22 that is separate from substrate body 12, it is contemplated that a cover stock (not shown) can be positioned over substrate body 12 such that when substrate body 12 is wrapped over itself, the cover stock serves as spacing element 22. The thickness of the cover stock, e.g., cardboard, paper, plastic, etc., can be varied to establish a desired resultant spacing when substrate body 12 is wrapped over itself.

As the substrate 12 is essentially wrapped around and over spacing element 22, the resulting RFID device 10 has virtually the same physical dimensions as the spacer element without compromising or reducing the actual length of the antenna 16. The spacing element 22 prevents the antenna 16 from shorting out since it provides a buffer between opposing portions of the antenna 16. The result is that the overall impedance of the antenna 16 when wrapped over spacing element 22 matches the impedance of IC component 14 but the size of the RFID device 10 is significantly reduced due to the ability of the substrate 12 to fold over the spacing element 22. Thus, due to the "wrapping" of the substrate 12 over the spacing element 22, RFID device 10 achieves impedance matching between the IC component 14 and the appropriate antenna pattern yet drastically reduces its overall size, while at the same time preventing a short in the antenna or circuitry on the device 10 due to the spacing element 22.

The device of the present invention may further include an electronic article surveillance ("EAS") element 24 coupled to the substrate body 12. The EAS element 24 may include an acousto-magnetic device having a strip of amorphous ferromagnetic metal, where the strips are free to oscillate mechanically and are identified by their resonating response to an induced magnetic field.

Alternatively, the EAS element may include a microwave device having a non-linear element (such as a diode) coupled to a microwave and electrostatic antenna. One antenna emits a low-frequency (about 100 kHz) field, and another one emits a microwave field, where the device acts as a mixer reemitting a combination of signals from both fields to trigger an alarm. Additional suitable EAS devices and/or tags as known in the art may be equally suitable for use with present invention.

Figure 6:
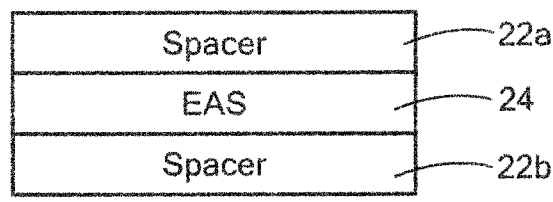
FIG. 6 illustrates an alternate configuration of the spacer element used in accordance with the present invention.

Now referring to FIG. 6, the EAS element 24 may be embedded or otherwise placed between one or more spacing elements 22, while the substrate body 12 remains disposed about an outer perimeter of the one or more spacing elements 22. In particular, the EAS element 24 may be disposed between a first spacing element 22a and second spacing element 22b (collectively referred to herein as "spacing elements 22"), where the substrate body 12 having the IC component 14 and antenna 16 is disposed about a portion of the perimeters of the first and second spacing elements 22, resulting in the folded configuration illustrated in FIG. 5. As the substrate body 12 and the EAS element 24 are not in electrical with one another, the desired impedance characteristics of the antenna/IC component pairing remains intact while allowing the RFID device 10 to provide both an identification as well as article surveillance function.

In an exemplary use of the RFID device 10, the RFID device 10 may be coupled to or otherwise positioned onto an article or item. The RFID device 10 may include the EAS element 24 embedded within one or more spacing elements. Moreover, due to the wrapping of at least a portion of the device about one or more spacing elements, the overall footprint of the RFID device is substantially reduced.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A radio frequency identification (RFID)/electronic article surveillance (EAS) device, the device comprising:
 a spacing element comprising a planar body with a predetermined thickness and formed of a dielectric material to define first and second major faces which are opposed to each other, the planar body having an EAS element embedded therein;
 a dielectric substrate body distinct from the spacing element, the dielectric substrate body defining an elongated length which includes a first surface and a second surface comprising opposing major sides of the dielectric substrate body;
 an RFID integrated circuit disposed on the dielectric substrate body;
 a dipole antenna disposed on the dielectric substrate body, the dipole antenna comprised of a first conductive element and a second conductive element, each electrically connected to the RFID integrated circuit, and each respectively extending away from the RFID integrated circuit along said elongated length of the dielectric substrate body in first and second opposing directions;
 each of the first and second conductive elements respectively comprise an inner length proximal to the RFID integrated circuit, and an outer length spaced apart from the RFID integrated circuit a greater distance along the elongated length as compared to the inner length;
 the elongated length of the dielectric substrate body is wrapped around at least a portion of the spacing element so that first surface is in contact with both the first and second faces of the spacing element; and
 wherein the dielectric substrate body is positioned so that the RFID integrated circuit and the inner length of each of the first and second conductive elements are adjacent to the first major face of the spacing element, and the outer length of each of the first and second conductive elements are disposed adjacent to the second major face of the spacing element.

2. The device according to claim 1, wherein the first and second conductive elements which form the dipole antenna are each respectively comprised of an electrically conductive material patterned on a surface of the dielectric substrate body.

3. The device according to claim 2, wherein the electrically conductive material pattern includes at least one of a plurality of polygons and a meanderline.

4. The device according to claim 3, wherein each of the plurality of polygons has a substantially rectangular shape.

5. The device according to claim 4, wherein each of the plurality of polygons is non-continuous to thereby provide a single electrically conductive path.

6. The device according to claim 1, wherein the spacing element is comprised of first and second spacing element portions and wherein the EAS element is disposed between the first and second spacing element portions.

7. The device according to claim 1, wherein the EAS element is an acousto-magnetic device.

8. The device according to claim 1, wherein the EAS element is a microwave device.

9. The device according to claim 1, wherein the dielectric substrate body is constructed from a material including at least one of polyimide, polyester, fiberglass, ceramic, plastic, and paper.

10. The device according to claim 1, wherein the each of the first and second conductive elements which comprise the dipole antenna are constructed from a material including at least one of copper, aluminum and conductive ink.

11. A combination radio frequency identification (RFID)/electronic article surveillance (EAS) device, the device comprising:
 a spacing element formed of first and second spacing element portions, the spacing element comprising a body with a predetermined thickness and formed of a dielectric material to define first and second major faces which are opposed to each other;

an EAS element disposed within the spacing element in contact with the first and second spacing element portions;

a dielectric substrate body distinct from the spacing element, the dielectric substrate body defining an elongated length which includes a first surface and a second surface comprising opposing major sides of the dielectric substrate body;

an RFID integrated circuit disposed on the dielectric substrate body;

a dipole antenna disposed on the dielectric substrate body, the dipole antenna comprised of a first conductive element and a second conductive element, each electrically connected to the RFID integrated circuit, and each respectively extending away from the RFID integrated circuit along said elongated length of the dielectric substrate body in first and second opposing directions;

each of the first and second conductive elements respectively comprise an inner length proximal to the RFID integrated circuit, and an outer length distal from the RFID integrated circuit;

the dielectric substrate body wrapped around the exterior of the spacing element so that the first surface is in contact with the first and second faces of the spacing element; and wherein the dielectric substrate body is positioned so that the RFID integrated circuit and the inner length of each of the first and second conductive elements are adjacent to the first major face of the spacing element, and the outer length of each of the first and second conductive elements are disposed adjacent to the second major face of the spacing element.

12. The RFID/EAS device according to claim 11, wherein the first and second conductive elements which comprise the dipole antenna are each respectively formed of an electrically conductive material pattern on the first surface of the dielectric substrate body.

13. The RFID/EAS device according to claim 12, wherein the electrically conductive material pattern includes at least one of a plurality of polygons and a meanderline.

14. The RFID/EAS device according to claim 13, wherein each of the plurality of polygons has a substantially rectangular shape.

15. The RFID/EAS device according to claim 13, wherein each of the plurality of polygons is non-continuous to thereby provide a single electrically conductive path.

16. The RFID/EAS device according to claim 11, wherein the EAS element is disposed between the first and second spacing element portions.

17. The RFID/EAS device according to claim 11, further comprising a third conductive element which forms an electrical connection between the RFID integrated circuit and each of the first and second conductive elements to form a current loop.

18. A method of assembling a radio frequency identification device (RFID)/electronic article surveillance (EAS) device, comprising the steps of:

providing a spacing element by positioning an EAS element between a first dielectric spacing element portion and a second dielectric spacing element portion to form a stack which defines a planar body having a first and second major face which are opposed;

disposing on a planar dielectric substrate body a dipole antenna and an RFID integrated circuit;

arranging a first conductive element and a second conductive element which comprise the dipole antenna respectively so that each is electrically connected to the RFID integrated circuit at a first end thereof and each extends away from the RFID integrated circuit along an elongated length of the planar dielectric substrate body in first and second opposing directions to a second end;

wrapping the elongated length of the planar dielectric substrate body around an exterior of the spacing element so that a first major surface of the planar dielectric substrate body is in contact with the first and second major faces of the spacing element; and positioning the planar dielectric substrate body relative to the spacing element so that the RFID integrated circuit and an inner length of each of the first and second conductive elements proximate to the first end is adjacent to the first major face of the spacing element, and an outer length of each of the first and second conductive elements proximate to the second end are disposed adjacent to the second major face of the spacing element.

\* \* \* \* \*